March 29, 1949. H. P. FOLKER 2,465,862
TRAIN CONTROL SYSTEM
Filed March 31, 1947 5 Sheets-Sheet 1
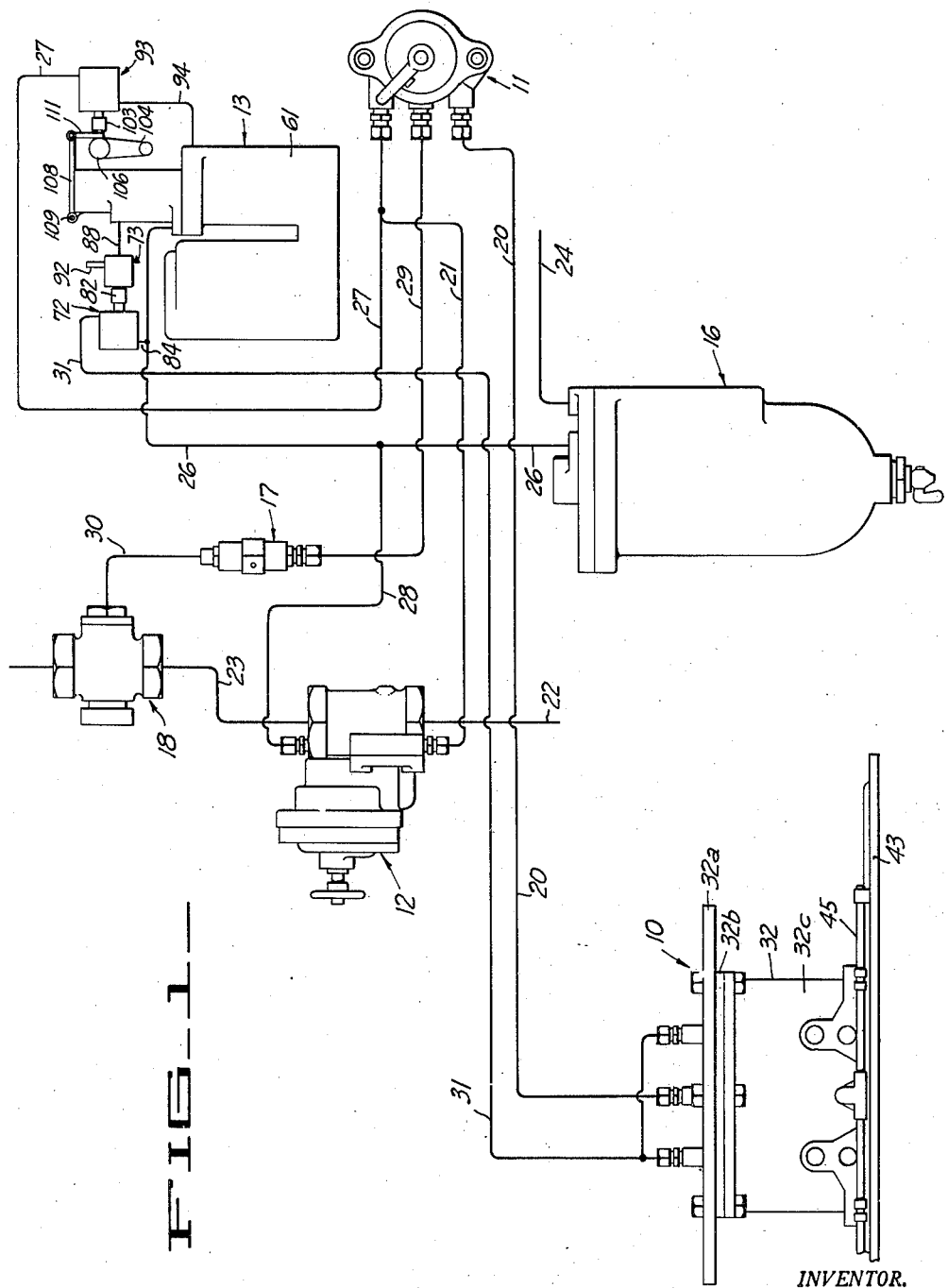
INVENTOR.
Herbert P. Folker
BY Paul D. Flehr
ATTORNEY March 29, 1949. H. P. FOLKER 2,465,862
TRAIN CONTROL SYSTEM
Filed March 31, 1947 5 Sheets-Sheet 2
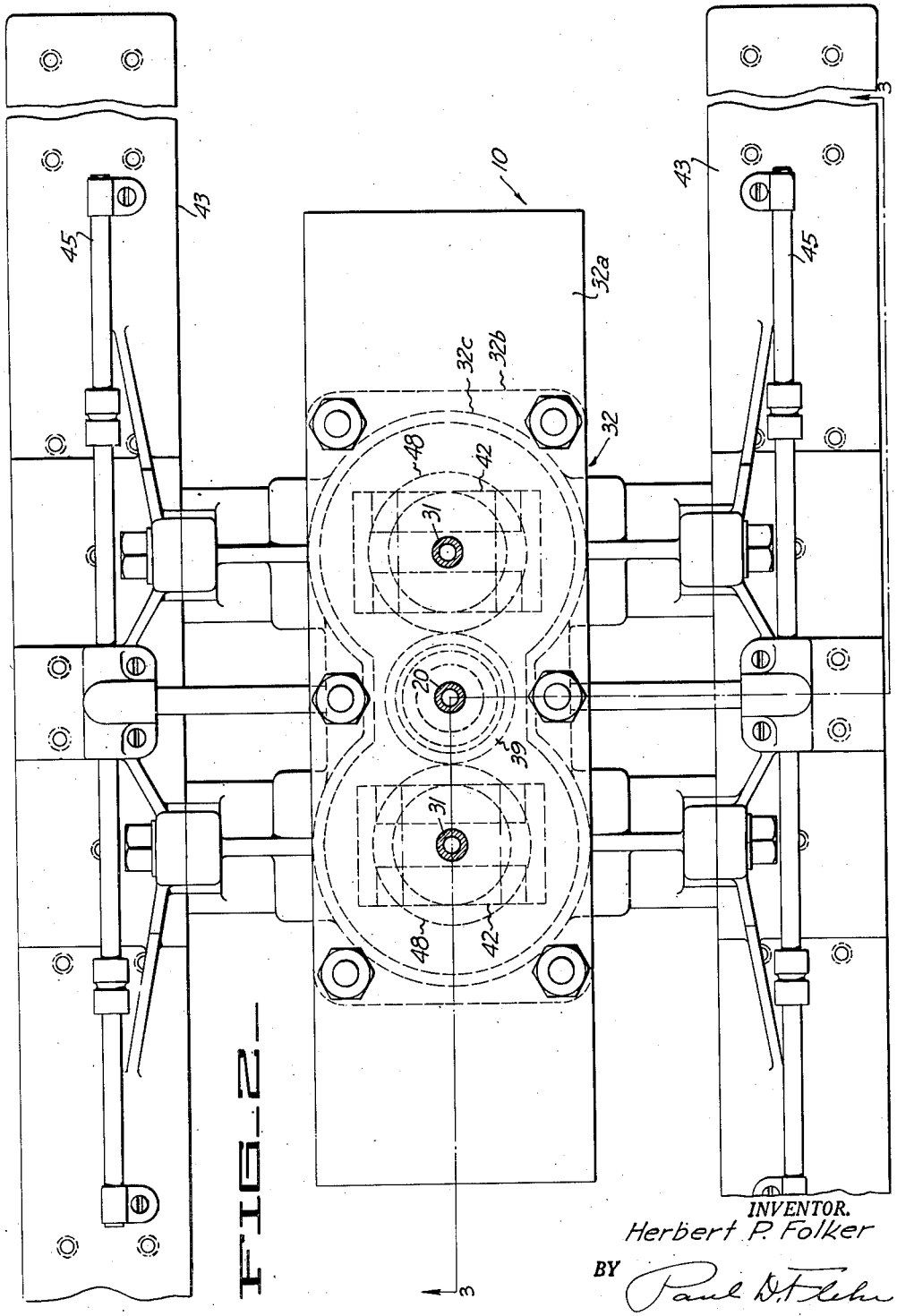
INVENTOR.
Herbert P. Folker
BY Paul D. Flehr
ATTORNEY

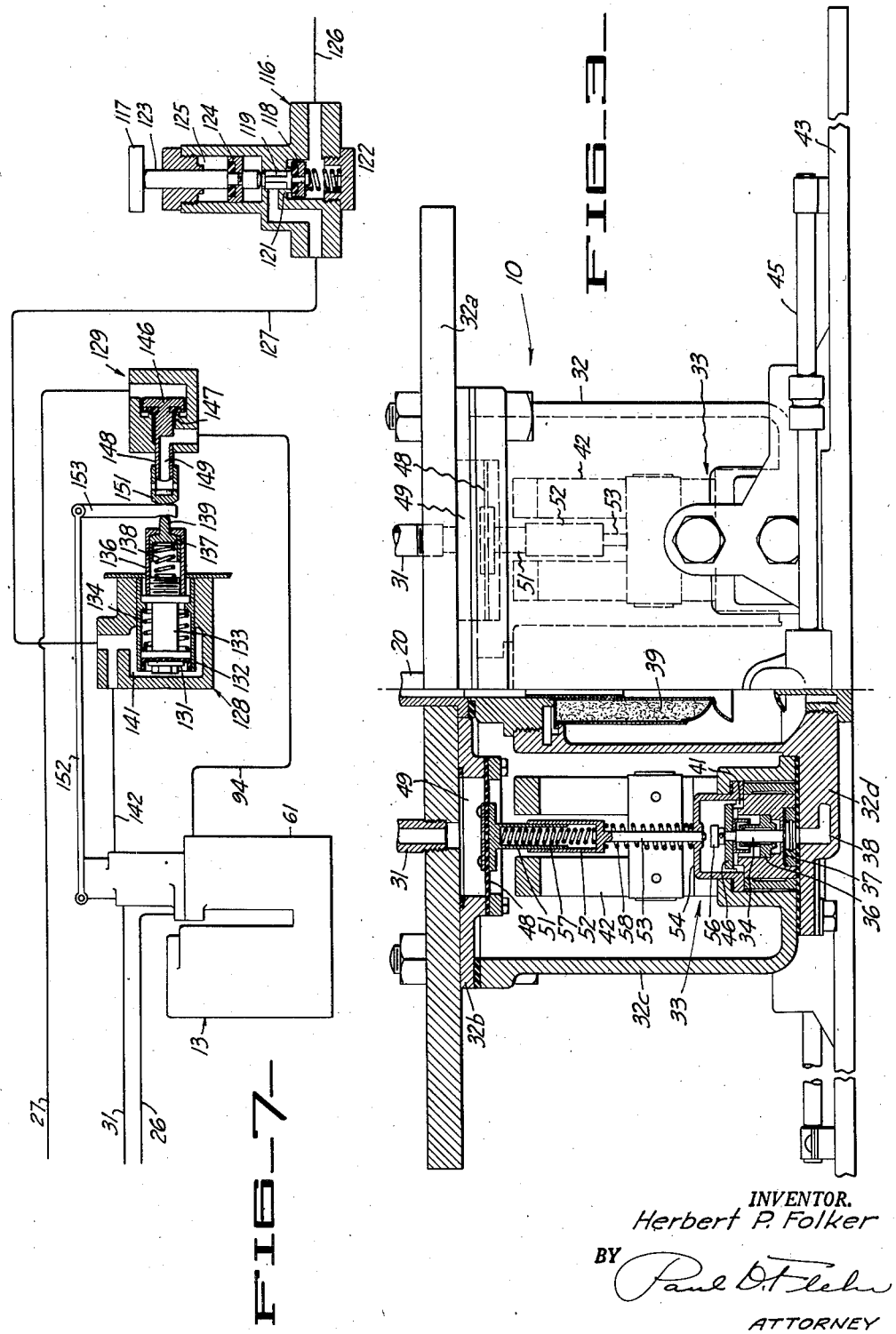

March 29, 1949.                    H. P. FOLKER                    2,465,862
                                TRAIN CONTROL SYSTEM
Filed March 31, 1947                                        5 Sheets-Sheet 4
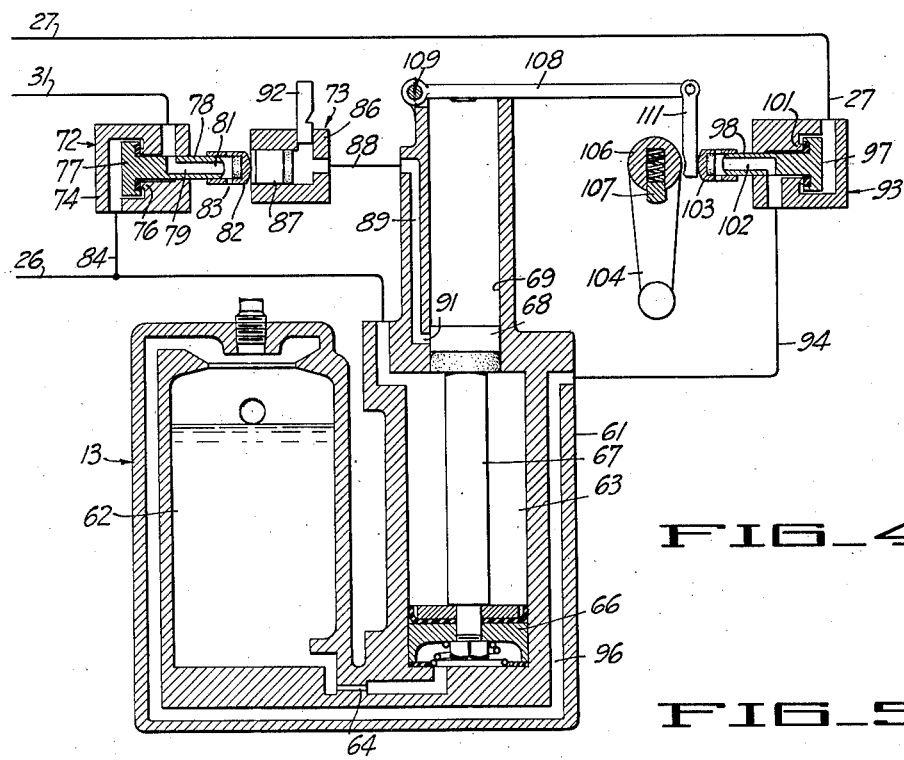
FIG_4_
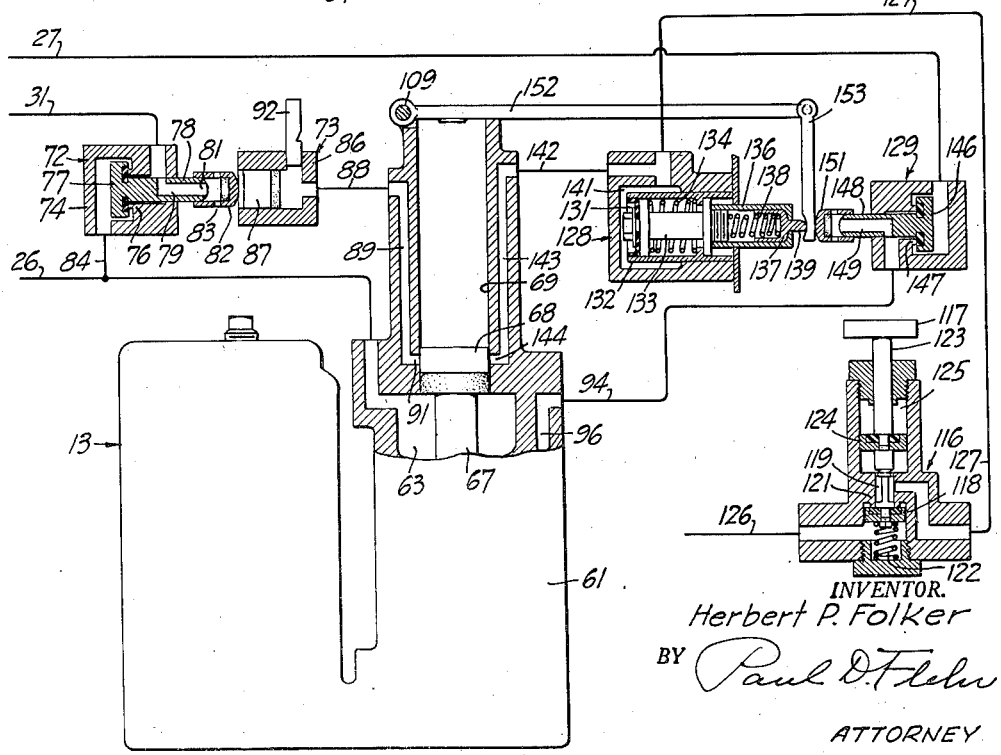
FIG_5_
INVENTOR.
Herbert P. Folker
BY Paul D. Flehr
ATTORNEY

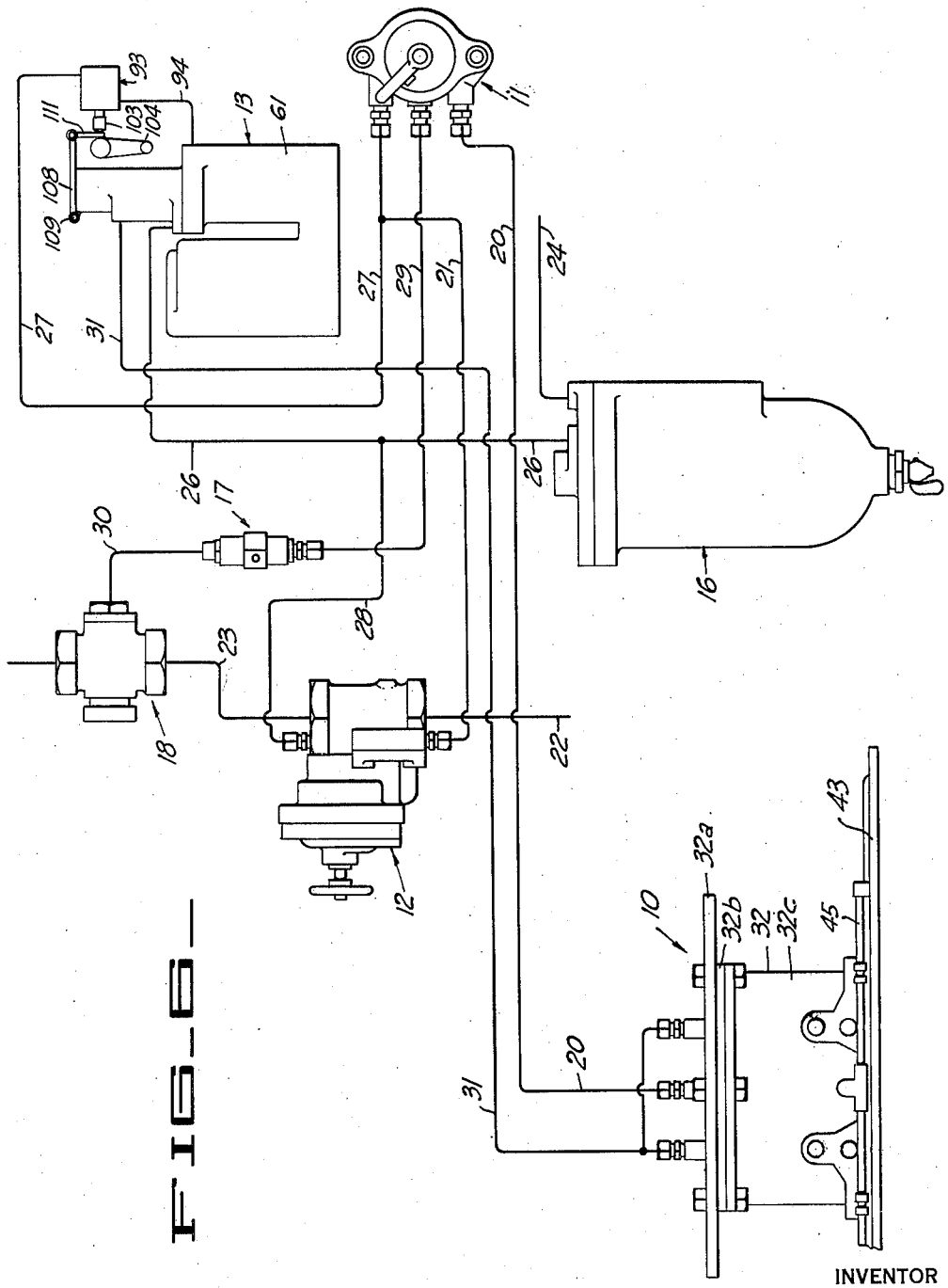

Patented Mar. 29, 1949

2,465,862

UNITED STATES PATENT OFFICE 2,465,862

TRAIN CONTROL SYSTEM

Herbert P. Folker, Oakland, Calif., assignor to National Safety Appliance Co., Ltd., San Francisco, Calif., a corporation of California Application March 31, 1947, Serial No. 738,473

3 Claims. (Cl. 303—18)

1

This invention relates generally to train control systems of the type adapted to effect an automatic brake application and to enable a manual forestalling operation to prevent a brake application under certain conditions.

In the past train control systems have incorporated means responsive to a track impulse for effecting an automatic brake application, together with forestalling means whereby an alert engineer may prevent an automatic brake application and thus maintain manual control of the train when passing through certain signal zones. One control system of this character (see Folker 1,439,081 and 1,690,816) makes use of a so-called automatic train stop valve which serves to vent the brake pipe of the train braking system, and which in turn is controlled by the venting of a control pipe leading to a so-called duplex control valve. The duplex control valve is generally mounted upon the locomotive and is actuated by a magnetic track impulse, when the valve passes over a track installed magnetic device. The control valve consists of a pair of valve devices having their valve members normally retained closed by a permanent magnetic field. Upon passing over a magnetic track device, the field of which has not been neutralized by a signal current, the magnetic holding field upon one of the two valve members is neutralized, with the result that pneumatic pressure from the control pipe causes that particular valve to open whereby the control pipe is continuously vented to the atmosphere to operate the automatic stop valve. Thereafter the engineer must restore the system by the operation of a release or restoring valve in order to release the brakes and restore the system to normal condition. The restoring valve serves to temporarily interrupt the control line and to vent that portion of the line leading from the duplex control valve, whereby the actuated valve member of the control valve is permitted to close. Thereafter communication of the control line with the stop valve is reestablished.

Forestalling units which have been utilized with the above-described train control system consist of a time delay means having an automatic timing cycle set in motion by the operation of a forestalling lever or other member (see for example Folker 1,592,930). At the beginning of the forestalling cycle a shut-off valve is operated which serves to interrupt the control line and to vent that portion of the line leading from the duplex control valve. This serves to prevent actuation of the duplex control valve by a magnetic track impulse. At the end of the forestalling period the shut-off valve just described reestablishes communication between the control line and the automatic stop valve.

A forestalling arrangement such as described above has certain inherent disadvantages, particularly in certain installations, as for example where the control line leading from the duplex control valve to the forestalling unit is relatively long. Under such conditions the amount of air required to recharge that portion of the control line leading from the forestalling unit to the duplex control valve, may be such as to drop the pressure to the automatic stop valve to such a value as to cause a momentary brake application. It is possible to overcome this difficulty by the use of line charging means such as disclosed in my co-pending application Serial No. 733,476, filed on March 10, 1947, and entitled "Train control system." However such a line charger is an added mechanical complication and its use in conjunction with the shut-off valve of the forestalling means retains the feature of venting air from the control pipe during the forestalling operation, which necessarily involves a substantial air loss.

It is an object of the present invention to provide a pneumatic train control system having a novel type of forestalling arrangement whereby the valve members of the duplex control valve are positively held in closed position during a forestalling operation, thereby preventing actuation of the same by a magnetic track impulse.

A further object of the invention is to provide an improved and simplified system of the above character, and in which the use of special line charging means can be omitted.

Another object of the invention is to provide a system of the above character in which the duplex control valve is provided with means to enable positive retention of the valve members of the same in closed position during a forestalling period.

Additional objects of the invention will appear from the following description in which the preferred embodiments have been set forth in detail in conjunction with the accompanying drawing.

Referring to the drawing:

Figure 1 is a diagrammatic view illustrating parts incorporating the present system and pipe connections for the same.

Figure 2 is an enlarged plan view of the duplex control valve shown in Figure 1.

Figure 3 is a cross-sectional view taken along the line 3—3 of Figure 2 illustrating the construction of the duplex control valve.

Figure 4 is a diagrammatic view in section showing the forestalling unit incorporated in Figure 1.

Figure 5 is a view partly in cross section illustrating a modified type of forestalling unit which can be used with the system of Figure 1 and which is adapted for remote operation.

Figure 6 is a view similar to Figure 1 and diagrammatically illustrates another embodiment of the invention.

Figure 7 is a diagrammatic view illustrating a modification of Figure 6 to incorporate a forestalling valve located remote from the forestalling unit.

The train control system illustrated in Figure 1 consists of a duplex train control valve 10 of the type adapted to be operated by magnetic tract impulse and as disclosed for example in Letters Patent 1,439,081, 1,439,082, 1,582,930 and 1,690,816. This valve 10 is utilized in conjunction with the release or restoring valve 11, the automatic stop valve 12 (see 1,529,058), and the forestalling unit 13. In addition to the parts just mentioned this system may include an air strainer 16, a double heading interlocking valve 17, and a double heading cut-out cock 18. The release or restoring valve 11, and valves 17 and 18 can be substantially as shown and described in Folker 1,690,816.

The piping for the various parts mentioned above is as follows: A control pipe 20 extends from the duplex control valve 10 to the restoring valve 11, and an extension 21 of the same extends from the restoring valve to the automatic stop valve 12. Line 22 which connects to the automatic stop valve 12 is a brake pipe of a conventional pneumatic train braking system. Line 23 leads from the stop valve 12 to the engineer's brake valve, and is equipped with a double heading cut-out cock 18. Pipe 24 is a connection from the main air supply reservoir of the braking system to the air filter 16. Line 26 is an extension of line 24 beyond filter 16 and connects with time delay means of the forestalling unit as will be presently explained. Pipe 27 leads from the control line 21 to the forestalling unit. Line 28 connects the automatic stop valve 12 with the air supply line 26. Pipe 29 connects the restoring or release valve 11 with the interlocking device 17, and line 30 connects this device to the double heading cut-out cock 18.

When the system is in condition to be operated by a track impulse to effect an automatic brake application, brake pipe 22 is maintained closed against venting to the atmosphere by the stop valve 12, while air pressure is maintained in control pipe portions 20 and 21, and cock 18 is open to permit control of the braking system from the engineer's cab. Pipe 28 which leads to the main air supply reservoir, is in restricted communication with the control pipes 20 and 21, through the stop valve 12. Each of the two valve devices in the duplex control valve 10 are retained closed magnetically, and when the control valve passes over a track magnet, the field of which has not been neutralized by a signal current, one of the two duplex control valve devices is opened to vent the control pipe, the particular valve operated dependent upon the direction of movement of the train. Venting of control pipe 20 to the atmosphere resulting from opening of one of the two control valves, reduces holding pressure upon the operating diaphragm of the stop valve 12, and as a result the valve member of the stop valve moves to a position to cause venting of the brake pipe 22 to the atmosphere.

As previously explained during a forestalling operation the duplex control valve 10 must be placed in such a condition that it will not respond to a magnetic track impulse. Instead of accomplishing this by the use of a shut-off valve which interrupts the control line and vents that portion of the line leading from the duplex control valve to the forestalling unit, in the present system the duplex control valve is of special construction and includes pneumatic pressure operated means adapted to positively retain the individual control valve members closed. The pressure chambers of the means just described are connected by pipe line 31 to the forestalling unit, whereby during a forestalling period pneumatic pressure is applied to this line, without in any way interfering with or venting the control line.

Figures 2 and 3 illustrate one manner in which the duplex control valve can be constructed in order to provide means for positively holding the individual valve members in closed position. The valve in this instance consists of a body 32 formed of separable body parts including the top mounting plate 32a, cover 32b, the main shell 32c, and the bottom plate or casting 32d. Within the shell are the two control valve devices designated generally at 33, which may be identical in construction and which are each capable of venting the control line 20. Each valve device consists of a plunger-like valve member 34 which is guided for vertical movement by bushing 36, and which is adapted to seal upon the upper face of a leather disc 37, thereby closing a central orifice in the latter. The lower body part 32c is provided with a passage 38 which connects with the chamber of a combined air filter and moisture trap 39. Control pipe 20 likewise connects with the filter chamber 39 as illustrated. The parts serving to carry the guide bushing 36 likewise carry a pair of magnetic pole pieces 41 which are magnetically connected by pole extensions to the permanent magnets 42, and also with the inductor planes 43. The mounting parts for the planes 43 have the usual break away pipes 45 whereby in the event of accidental breakage the control pipe is vented. An armature 46 is attached to the upper end of valve member 34 and normally rests upon the pole pieces 41. Thus armature 46, because of the magnetic field of the permanent magnet 42, normally holds the valve member 34 in closed position against air pressure in passage 38. When the inductor planes 43 pass over a track magnet, the field of which has not been neutralized by signal current, a magnetic impulse is applied to the pole pieces 41 with a result that the field of magnet 42 is neutralized thus permitting armature 46 to move upwardly together with the valve member 34. As a result air flows from passage 38 through the small orifice in the center of leather disc 37, and vents to the atmosphere. Such venting initially drops the pressure in control pipe 20 to such a value that the automatic stop valve 12 is operated to effect a brake application. However because of the continuous bleeding of air through the stop valve and into the control line, some venting continues to occur through the control valve and the particular valve member which has been actuated remains in open position. As described above the duplex control valve is similar to the magnetically operated valve devices described in Patent No. 1,548,593.

In addition to the parts of the duplex control valve described above I provide each control valve device with a pressure operated means or device including a flexible diaphragm 48 or like pressure operated member. A peripheral edge portion of the diaphragm is shown clamped to the body part 32b and this body part is recessed to provide the closed chamber 49 above the diaphragm. Each chamber 49 is in communication with the line 31 or a branch of the same. A thrust transmitting connection is provided between the diaphragm 48 and the associated valve member 34. The connection in this instance consists of a tube 51 having its one end attached to the diaphragm 48, and telescopically engaging within a tube 52, which in turn is attached to a push rod 53. The lower portion of rod 53 is slidably retained by the shell 54, and is adapted to engage the nut 56 which is attached to valve member 34 above the armature 46. A compression spring 57 is disposed within the tube 51 and a second compression spring 58 surrounds rod 53 and is interposed between tube 52 and shell 54.

When diaphragm 48 is flexed downwardly sufficient force is transmitted through spring 57 to urge rod 53 downwardly whereby its lower end engages and retains the valve member 34 in closed position. Spring 57 is advantageous in that it avoids application of too much force to the valve member. Spring 58 insures return of rod 53 to its uppermost position.

The forestalling unit illustrated in Figure 1 is of the direct manual operated type and is better illustrated in Figure 4. As diagrammatically illustrated in Figure 4 it consists of a body 61 formed to provide the liquid reservoir 62 and a cylinder 63. The reservoir is adapted to contain a quantity of suitable liquid such as oil, and its lower portion is connected to the lower end of cylinder 63 through the flow restricting orifice 64. A piston 66 is fitted within cylinder 63, and is attached to the lower end of a piston rod 67. The upper end of rod 67 carries the second piston 68 which operates within the second cylinder 69. Pipe 26 leading from the main reservoir supply connects with the upper portion of cylinder 63 as indicated, whereby the upper side of piston 66 is at all times subjected to the pressure of the main reservoir. It may be explained at this point that the parts just described form an automatic timing means in which initially liquid is expelled from reservoir 62 to move the piston 66 upwardly. At the upper end of the piston's travel application of pressure to the liquid is discontinued and thereafter the piston returns to its normal position because of the constant pressure in cylinder 63 above piston 66.

In conjunction with the parts of the forestalling unit described above I provide a shut-off valve 72 in conjunction with a pneumatic operator 73. Shut-off valve 72 consists of a body 74 having a stationary seat 76 engaged by the valve member 77. Valve stem 78 is provided with a duct 79 as illustrated leading from an orifice 81 at the outer end of the stem. A valve cap 82 engages the outer end of the stem, and is provided with vent ports 83. One side of the valve seat 76 is directly connected by pipe 84 to the main reservoir supply pipe 26. The other side of the seat is connected to the pipe 31 leading from the duplex control valve.

A pneumatic actuator 73 consists of a body 86 formed to provide a cylinder which is fitted with the piston 87. Pipe or duct 88 connects to the body 86 with a duct 89, which leads to the port 91 formed in the wall of cylinder 69. When valve piston 68 is in its normal lower position illustrated in Figure 4, port 91 is sealed from communication with space 63 but is in communication with the atmosphere by virtue of leakage about the upper portion of the valve piston. Application of pressure through line 88 serves to move the piston 87 in a direction to engage the valve cap 82, thus closing orifice 81 and moving the stem 78 to unseat the valve member 77.

An additional valve 93 connects with the pipe 27, and is also connected to line 94, which in turn connects through duct or passage 96 with the upper end of the reservoir 62. Valve 93 consists of a valve member 97 carried by the stem 98 and engaging the stationary seat 101. Stem 98 has a duct 102 leading from an orifice in the end of the same, and normally communicating with line 94 as illustrated. A vented valve cap 103 is carried by the outer end of stem 98. A manual forestalling lever 104 is carried by the journaled shaft 106, and this shaft carries a spring pressed lug 107.

Overlying the path of movement of the piston 68 there is a latch lever 108 having its one end pivoted at 109 and its other end pivotally attached to the latch bolt 111. Normally the lower end of this latch bolt is interposed between the valve cap 103 and shaft 106. When the forestalling lever 104 is turned by the operator to bring lug 107 in engagement with the lower portion of latch bolt 111, motion is transmitted to the latch bolt to close cap 103 upon stem 98, and to unseat the valve member 97. When the piston 68 reaches the upper end of its travel it moves the latch lever 108 upwardly to retract the latch bolt 111, thus permitting valve member 97 to close and valve cap 103 to open, and permitting the lever 104 to drop down to its initial position.

Operation of my system as a whole can now be described as follows: As previously explained when one of the two duplex control valves is operated by a magnetic track impulse, control valve 10 is vented and as a result the automatic stop valve 12 is operated to effect a brake application by the venting of brake pipe 22. Assuming however that it is desired to carry out a forestalling operation to prevent an automatic brake application while the train proceeds through a given signal zone, the engineer operates forestalling lever 104 to thereby close the valve cap 103 and unseat the valve member 97. This serves to apply pressure from pipe 27 through pipe 94, duct 96, to the upper portion of the reservoir 62. Since the upper effective fluid area of piston 66 is considerably less than its bottom area, the liquid pressure forces the piston 66 upwardly at a predetermined rate determined by the size of the orifice 64 and the pressures involved. Shortly after initial movement of the piston 66, piston 68 moves above the port 91 whereby this port is exposed to the main reservoir pressure in the upper portion of the cylinder 63. Thus air is applied to duct 89 and line 88 to the pneumatic actuator 73 to operate the signal whistle 92 and to move piston 87 in a direction to close valve cap 82 and to unseat valve member 77. Unseating of valve member 77 serves to connect the line 31 with line 84, whereby air pressure from the main reservoir supply is applied through line 31 to the diaphragm 41 of the duplex control valve. Flexing of these diaphragms serves to force rods 53 in engagement with the valve members 34 whereby these valve members cannot be released by a magnetic track impulse but remain closed throughout the forestalling period.

When piston 66 reaches the upper limit of its travel piston 68 strikes the latch lever 108 to retract the latch bolt 111. As a result valve 97 closes and valve cap 103 opens. Thus communication between pipes 27 and 94 is interrupted and the air pressure in reservoir 62 is vented to the atmosphere. Main reservoir pressure acting upon the upper side of piston 66 now forces the piston downwardly with liquid being expelled from the lower portion of the cylinder back into the reservoir 62. When the two pistons reach the lower end of their travel port 91 is again sealed from communication with space 63 and is vented to the atmosphere about the loose fitting upper portion of piston 68. As a result valve member 77 returns to its initial position, and valve cap 82 returns to open position to vent the line 31. Thus the duplex control valve is again placed in condition to effect an automatic brake application in response to a track impulse.

The apparatus described above incorporates an inherent safety feature in that it is impossible to prevent an automatic brake application by operating the forestalling lever immediately after or about the same time that the duplex control valve is operated by a track impulse. As previously explained when the duplex control valve is operated the pressure in lines 20, 21 and 27 is reduced to effect an automatic brake application. If the forestalling lever 104 is operated to open the valve 97 and thus connect lines 27 and 94, a relatively low pressure will be transmitted to the space above the liquid in reservoir 62, and such low pressure will be insufficient to permit the pistons 66 and 68 to move upwardly as in a normal forestalling operation. Thus operation of the duplex control valve effects an automatic brake application irrespective of operation of the forestalling lever simultaneously with or immediately after the receipt of the track impulse.

It will be apparent from the above that my system and apparatus has certain advantages over forestalling systems of the type previously described, where a double seated shut-off valve is utilized to interrupt the control line during a forestalling operation, and to vent that portion of the control line leading to the duplex control valve. In particular the pipes connecting the forestalling unit with the duplex control valve may be any length desired, without in any way interfering with operation of the system. In addition the valve required in conjunction with a forestalling unit for applying holding pressure to the duplex control valve is relatively simple in construction and operation.

In Figure 5 I have shown a forestalling unit which can likewise be used with my system, and which can be operated at a remote point from the timing means employed. Thus in this instance a separate manually operated valve 116 is employed, which can be located at any desired point, and which has an operating button 117 adapted to be depressed by the engineer or other operator. This valve consists of a valve member 118 attached to the fluted stem 119, and urged against the stationary seat 121 by the spring 122. The fluted stem 119 can be engaged by the lower end of a rod 123, which has the button 117 attached to its outer end. A piston 124 is also attached to rod 123 and operates in the cylinder 125. Line 126 connects with one side of the valve and leads to the main reservoir supply. Line 127 connects to the other side of the valve and leads to the pneumatic actuator 128. This actuator serves to cooperate with a valve 129, performing a function somewhat similar to the valve 93 of Figure 4.

Pneumatic actuator 128 consists of a piston 131 fitted within a cylinder 132, and attached to the piston rod 133. Compression spring 134 urges the piston 131 in one direction toward a limiting stop. A hollow rod 136 connects with rod 133, and is fitted with a slidable member 137, normally urged in one direction by spring 138. Member 137 carries a normally projecting stud 139. The chamber 141 within the body of actuator 128 and one side of the piston, is connected by pipe 127 to the remote valve 116 and by pipe 142 with a duct 143 of the timing means which leads to a port 144 in a wall of cylinder 69.

Valve 129 consists of a valve member 146 engaging the stationary seat 147, and attached to the stem 148. This stem is likewise provided with duct 149 communicating through an orifice in the outer end of the stem, and the stem is provided with a vented valve cap 151. Latch lever 152 corresponds to the lever 108 of Figure 4 and latch bolt 153 corresponds to the bolt 111. The lower end of latch bolt 153 is normally interposed between the stud 139 and the valve cap 151. Shut-off valve 72 and also the pneumatic actuator 73 of Figure 5 are substantially the same as the corresponding devices of Figure 4.

The arrangement of Figure 5 operates as follows: To initiate a forestalling operation the engineer depresses button 117, and as a result valve member 118 is opened to permit air from pipe 126 to flow through pipe 127, to the pneumatic actuator 128. The piston 131 of the pneumatic actuator is thereupon moved to apply motion to the lower end of the latch bolt 153, whereby the valve cap 151 is closed and valve member 146 unseated. Thus pressure from pipe 27 is applied through valve 129 and line 94 to the liquid reservoir as previously described. Piston 66 now commences its upward movement, and when the piston 68 has moved above the port 91, the pneumatic operator 73 operates the shut-off valve 72 in a manner previously described to connect line 31 with the main reservoir supply whereby the two valve members of the duplex control valve are held closed. At the same time that port 91 is placed in communication with space 63, port 144 is likewise connected to the same space whereby line pressure from the upper portion of the cylinder 69 is applied through pipe 142 to the pneumatic actuator. Now the operator may release the button 117, and its release results in the button rising to the upper limit of its movement under the urge of piston 124.

When the piston 68 strikes and moves the latch lever 152, latch bolt 153 is retracted whereby valve member 146 closes and valve cap 151 is permitted to vent the line 94. As a result the piston 66 commences its downward movement. When the piston nears the lower end of its travel its packing cup passes below both ports 144 and 91, communication between these ports and space 63 is again interrupted and the ports vented to the atmosphere. Therefore the pneumatic actuator 73 permits closing of the valve 77, and the pressure applied through line 142 is permitted to drop to atmospheric to permit retraction of the pneumatic actuator 128. At the same time release of pressure upon the under side of piston 124 of valve 116 permits button 117 to drop down to its normal position thus indicating that the forestalling period has ended. Pressure in pipe 142 drops down to atmospheric upon closing of port 144, due to leakage from this port to the atmosphere about the piston.

Duration of the forestalling period can also be indicated by a small whistle connected with line 127.

In the embodiments described above a valve 72 and a pneumatic actuator 73 for the same are employed for the purpose of applying main reservoir pressure to the line 31 during a forestalling operation. In Figure 6 a simplified arrangement is illustrated in which both the valve 72 and its pneumatic actuator 73 are omitted. Thus in this instance the line 31 is directly connected to the duct 89 and port 91 of the cylinder 69 (see Figure 4). As previously explained main reservoir pressure is always present in the cylinder 63 of the forestalling unit above the piston 66. However for a normal position of the piston 66, piston 68 seals below port 91 to prevent application of main reservoir pressure to the pipe line 31, while leakage past the upper part of piston 68 vents line 31 to the atmosphere. After initial movement of piston 66 and piston 68, port 91 is uncovered as previously explained, whereby main reservoir pressure is then directly applied through duct 89 to the pipe line 31. Thus piston 68 and port 91 provide valve means for controlling application of pressure to line 31 during a forestalling period.

In Figure 6 I have indicated a direct manual type of forestalling unit such as is illustrated in detail in Figure 4. In Figure 7 I have illustrated a modification of Figure 6 to incorporate forestalling means such as illustrated in Figure 5 and adapted for remote control. Here again as in Figure 6 the line 31 leading from the duplex control valve makes direct connection with the duct 89 of the forestalling unit whereby main reservoir pressure is applied to this line during the forestalling period the same as described above with reference to Figure 4.

I claim:

1. In a pneumatic train braking system including an automatic stop valve and a control line connected to the automatic stop valve and serving when vented to operate the stop valve to effect application of the train brakes, a pair of control valves serving to control venting of the control lines, each valve being normally magnetically held in closed position and being responsive to the receipt of a magnetic track impulse to permit opening of the same to vent the control line, pneumatic pressure operated means adapted to hold said control valves in closed position to prevent an automatic application of the same, a forestalling unit having an automatic cycle of operation initiated manually, a valve operated by said unit, a connection from said valve to said pressure operated means and another connection from said valve to a source of air pressure, said valve in one normal position of the same serving to interrupt communication between said last named lines and to vent the line leading to said pressure operated means, and in the other position of the same serving to connect said lines together, and means in conjunction with the forestalling unit for effecting automatic operation of said valve whereby during a forestalling period pneumatic pressure is applied to said pressure operated means to hold said control valves closed during a forestalling period.

2. In a pneumatic train braking system, a duplex control valve adapted to be mounted upon a train and to be operated by magnetic track impulses, said duplex control valve comprising a pair of valve devices each normally magnetically held in closed position and adapted to be opened in response to a magnetic track impulse, a pressure operated device associated with each of said valve devices and including a fluid pressure operated member whereby when pneumatic pressure is applied to the pressure operated device said pressure operated member is moved to apply force to the associated valve device to retain the latter in closed position, means forming a pneumatic connection to the two control valve devices, and means forming a separate pneumatic connection to said pressure operated device.

3. A pneumatic train braking system as in claim 1 in which the forestalling unit includes a member which is elevated and then lowered to its initial normal position during the time period of the forestalling cycle, a connection from the control line serving to apply force to said member to elevate the same, a pneumatic pressure operated actuator for that valve which is connected to said pressure operated means, and additional valve means connected to said actuator and serving to supply air under pressure to the same when said member is elevated from its normal position.

HERBERT P. FOLKER.

REFERENCES CITED

The following references are of record in the file of this patent:

UNITED STATES PATENTS

| Number | Name | Date |
| --- | --- | --- |
| 1,538,931 | Farmer | May 26, 1925 |
| 1,611,148 | Allison | Dec. 21, 1926 |